United States Patent [19]

Miko et al.

[11] 4,277,262

[45] Jul. 7, 1981

[54] REUSABLE AXIAL FILTER FOR HIGH TEMPERATURE GASES

[75] Inventors: Richard J. Miko, Paramus, N.J.; Daniel H. Shapiro, Roslyn Heights, N.Y.

[73] Assignee: Edo Corporation, College Point, N.Y.

[21] Appl. No.: 20,484

[22] Filed: Mar. 14, 1979

[51] Int. Cl.³ ............................................. B01D 46/40
[52] U.S. Cl. ........................................ 55/278; 55/487; 55/492; 55/498; 55/499; 55/520; 55/522; 89/1 B; 102/531
[58] Field of Search .......... 55/267, 278, 492, 497–499, 55/520, 522, 525, 529, 385 R, 490, 482, 487; 89/1 B; 102/39; 210/497.1

[56] References Cited

U.S. PATENT DOCUMENTS

| | | | |
|---|---|---|---|
| 2,095,470 | 10/1937 | Foley | 55/278 UX |
| 2,952,342 | 9/1960 | Schnittker | 55/482 X |
| 3,266,228 | 8/1966 | Plizak et al. | 55/487 X |
| 3,441,145 | 4/1969 | Pearson | 55/278 X |
| 3,487,610 | 1/1970 | Brown et al. | 55/278 X |

FOREIGN PATENT DOCUMENTS 9228  9/1911  United Kingdom ...................... 55/520

OTHER PUBLICATIONS

Jones, J. I., Part 2-High Temperature Resistant Fibres from Organic, Polymer Precursors, In Filtration & Separation, 7(3): p. 303, May/Jun. 1970.

*Primary Examiner*—Kathleen J. Prunner
*Attorney, Agent, or Firm*—Davis, Hoxie, Faithfull & Hapgood

[57] ABSTRACT

A reusable filter to remove contaminants from high temperature gases, in excess of 4500° F., developed by burning propellants and used to do work such as actuation of piston-powered devices in aircraft store ejector racks. Contaminants are removed to prevent fouling of the device being acted upon. The filter has at least one metal strip wound in the form of a flat spiral about a central member, the turns of the flat spiral being spaced from one another to permit axial entry of gas between the turns. A further flat spiral filter may be similarly constructed about the central member and axially displaced from the first filter, and both such filters may have different filtering capacities. On each flat spiral, protuberances are spaced along one side of the metal strip to establish filter gaps between the turns. The one or more flat spirals are restrained at their outer circumference by a cylindrical casing having inlet and outlet ends for the hot gas. Convoluted spacing supports serve to maintain the axial positioning of the one or more flat spirals within the casing, and also maintain the shape of the casing at positions where the casing is not in contact with the outer circumference of the spirals. The metal strip forming each flat spiral, and the convoluted spacing supports, are made of molybdenum, columbium or tantalum. Filtering gaps in a radial direction between adjacent turns of each spiral may be of the order of a few microns to a few hundred microns.

7 Claims, 3 Drawing Figures

REUSABLE AXIAL FILTER FOR HIGH TEMPERATURE GASES

BACKGROUND OF THE INVENTION

The invention relates to a filter that may be reused many times without damage to remove dirt and other contaminants from high temperature gases generated by burning propellants, and thus prevent the contaminants from fouling movable members exposed to the gas.

Present day military aircraft of high performance capability require external stores to be displaced from the aircraft at high velocity in order for the stores to properly leave the aircraft flow field without damage. This is generally accomplished by ejector racks, missile launchers and the like, using explosive cartridges that create high temperature gases as an energy source. The high temperature gases act on piston actuated devices that in turn eject the stores at the desired high velocity. The propellants burnt in conventional cartridges generate gases of a temperature in excess of 4500° F. Unburnt propellant, residue from igniters, oxides from the cartridge cases, and erosion of the breech all create particles which act to ultimately foul the ejector rack piping and the ejector guns or the like.

In the past, the residue of these particles has been removed by periodic disassembly and cleaning of the rack and the like, which is costly and affects operational availability of the rack. On the other hand, the failure to carry out periodic cleaning affects reliability, since the residue build-up can cause the rack to fail to operate properly. Various solutions to this problem have been sought, including attempts to arrive at a clean burning cartridge that does not provide contaminants, and attempts to design a filter to remove the contaminants from the high temperature gas path before the gas acts on the piston actuated devices. A sufficiently clean burning cartridge is yet to be developed, and filters that may be reused through a large number of operational cycles have not been satisfactorily obtained because of the destructive effects of the high gas temperature on the filter.

SUMMARY OF THE INVENTION

Th present invention consists of a reusable filter for high temperature gases which will collect the residue from the gas and thereby provide cleaner gas to a piston actuated device such as found in an ejector rack, missile launcher or the like. The device operation will then be more reliable, and will result in a need for less maintenance than present systems. The filter is constructed with particular materials and a particular design configuration so as to withstand, without ablation or erosion, gas temperatures of over 4500° F. A hot gas filter thereby may be obtained which will be reusable in bomb racks, guns and the like through many firings, without jamming or fouling of the piston actuated devices and without the need for maintenance. The present invention utilizes filter components made from either molybdenum, columbium or tantalum, which have sufficiently high melting points in relation to the hot gas generated. The filter also is designed with sufficiently large spiral strip and spacer supporting components to provide adequate heat sinks to prevent melting, the spiral strip having its adjacent turns mechanically spaced to provide fine slots between the turns to capture the contaminants. The components, however, must not be so large as to cool the gas too much and dissipate its energy before the gas reaches the point where it is to act as an energy source; the components must also be sufficiently small to fit within the intended working environment of an aircraft or missile. The design must also be of sufficient size to provide maximum filtering capacity without excessive pressure drop in the gas.

The invention may also have applicability where the hot gases from burning propellants are used to actuate devices or drive mechanisms such as in gyroscopes in a missile, or to provide thrust in a missile to change its path, it being desired in the former instance that contaminants in the gas not foul the gyroscope and in the latter instance that contaminants in the gas not foul control valves through which the gas passes.

DESCRIPTION OF EMBODIMENT

Figure 1:
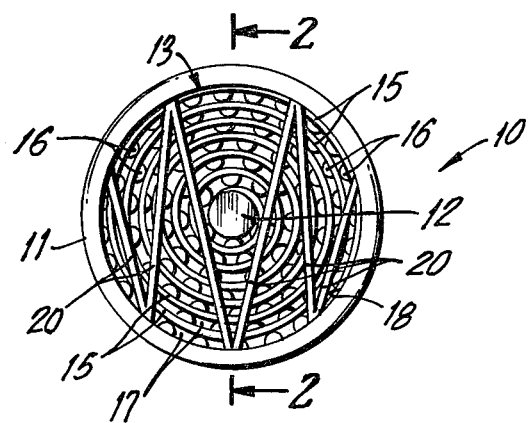
FIG. 1 is an end elevational view at the entrance end of the filter of the present invention.
Figure 2:
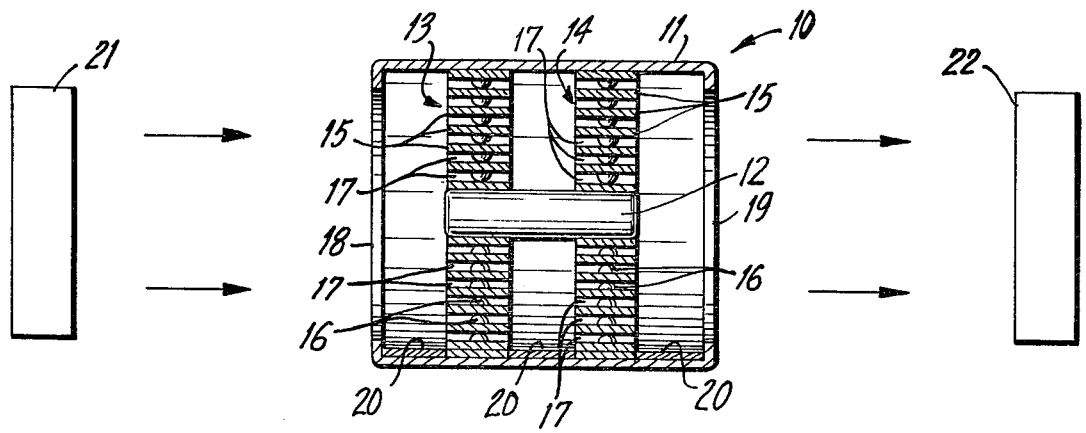
FIG. 2 is a cross-sectional view of the filter taken along lines 2—2 of FIG. 1.
Figure 3:
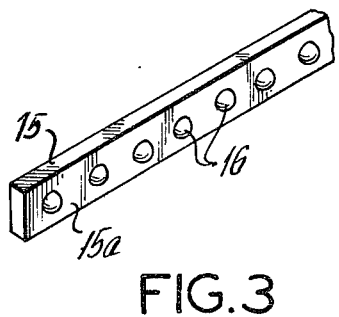
FIG. 3 is a view of a portion of the strip forming the filter of the present invention.

Referring now to the drawings, hot gas filter 10 of the present invention has a generally cylindrical outer shape determined by casing 11. Within casing 11 is centrally located plug 12. The filter 10 has one or more flat spirals, shown as 13 and 14 in FIG. 2, each flat spiral being formed by a flat metal strip 15 which is wound about central plug 12 as illustrated in FIGS. 1 and 2. Each metal strip 15 has generally round protuberances 16 spaced along one side 15a of strip 15, as shown in FIG. 3, the spaced protuberances 16 serving to space adjacent turns of each flat spiral from each other and to form radial gaps 17 therebetween. Each flat spiral is formed of a large number of turns, in the order of over a hundred for example, with FIGS. 1 and 2 accordingly being a diagrammatic representation.

Each flat spiral, such as 13 and 14, extends outward to, and is radially restrained by, casing 11, in order to tightly lock up the filter in its radial direction. Protuberances 16 are spaced close enough to each other along the strip 15 so as to provide rigidity to the filter and accurately establish the radial spacing between adjacent turns of the spirals 13 and 14.

Axially extending between entrance end 18 of the filter and spiral 13, between exit end 19 of the filter and spiral 14, and between spirals 13 and 14 if two spirals are utilized, are positioned convoluted spacing supports 20. One such spacing support formed from a continuous strip which has been bent is seen in FIG. 1, and is of a shape and strength to maintain the axial position of the one or more spirals in the filter as well as to structurally support and maintain the cross-sectional integrity of the casing 11 of the filter at those peripheral portions of the casing not supported by the one or more flat spirals such as 13, 14.

As diagrammatically illustrated in FIG. 2, the hot gas from burning cartridge 21 flows to movable member 22, such as a piston powered device, by passing through filter 10. The gas enters entrance end 18 of the filter and passes through flat spiral 13 through gas flow gaps 17 defined by the radial spacing between adjacent turns of spiral 13 established by protuberances 16 on strip 15. The high temperature gas then passes either directly out of filter 10 at exit end 19, in the case of a single spiral filter, or first passes through similar gaps 17 similarly defined in spiral 14 in the case of a multistage filter. Two or more such axially spaced filtering spirals may be used in a multistage filter.

By virtue of passing through the filter, contaminant particles are eliminated from the high temperature gas by being captured at the gas flow gaps 17 by virtue of the narrow radial distance between adjacent turns of spirals 13, 14. This radial distance, defined by the thickness of protuberances 16, may vary from a few microns to a few hundred microns by way of example, depending on the filtering action desired, and the radial distance may differ between the plurality of spirals in a multistage filter.

The casing 11 and central plug 12 may be constructed of corrosion resistant steel, since they are not excessively exposed to hot gas flow. The one or more metal strips 15, depending on the number of flat spirals, and the spacing supports 20, must be constructed of a metal with a sufficiently high melting point so that the hot gas of a temperature in excess of 4500° F. will not cause melting as it passes over these components. Molybdenum, columbium or tantalum may be used for strips 15 and spacing supports 20 in a filter according to the design of the present invention.

The size of the strips 15 and spacing supports 20 of the filter must be such as to absorb sufficient heat to prevent melting, but not excessive so as to overly cool the gas before it reaches the point beyond the filter where the gas is to serve as an energy source and do work. The filter should have sufficient filtering capacity so that the gas is not subjected to a large pressure drop in passing through the filter. The aircraft or missile environment in which the filter has application also dictates a small size and weight of filter. Certain applications of the present invention may require a multistage filter of a plurality of spirals in order to fit these various objectives, with spiral 13 being a coarse filter and spiral 14 being a fine filter for example. The strips 15 will generally be several times thicker in the filter radial direction than the thickness of protuberances 16, and coarser or finer filter gaps may be established by varying the thickness of protuberances 16.

It should be understood that modification of the present invention may be made without departing from the spirit and scope of the invention as hereinafter claimed.

What is claimed is:

1. A hot gas filter to remove contaminants from a gas stream generated by a burning propellant and having a gas temperature in excess of 4500° F., the filter to be capable of surviving numerous exposures to the hot gas without damage and to be used in a system between the burning propellant and a movable member downstream of the filter to reliably prevent fouling of the downstream member after numerous exposures to the hot gas, said filter comprising: an essentially cylindrical metal casing with entrance and exit ends; a centrally-located metal plug within the casing; at least one flat spiral element formed by a flat metal strip wound about the plug to form a plurality of turns in the spiral, the outer circumference of said spiral being radially positioned and restrained by said casing; one side of the spiral metal strip having spaced protuberances to establish a spacing between adjacent turns of the spiral to define filter gaps; a plurality of metal spacing supports extending axially and across the casing at positions within the casing not occupied by the spiral element, to axially position the spiral element within the casing and support the peripheral shape of the casing; each spacing support being a convoluted strip which contacts the interior surface of the casing at a number of points along the convoluted strip; and the strip and spacing supports being comprised of a metal capable of withstanding the high temperature gas without melting.

2. The invention defined in claim 1, having at least two axially spaced flat spiral elements and a spacing support between each two adjacent spiral elements.

3. The invention defined in claim 2, the filter gaps of one spiral element having a different radial dimension from the filter gaps of a second spiral element.

4. The invention defined in claim 3, wherein each spacing support is a convoluted strip.

5. The invention defined in claim 1, wherein the metal comprising the strip and spacing supports is molybdenum.

6. The invention defined in claim 1, wherein the metal comprising the strip and spacing supports is tantalum.

7. The invention defined in claim 1, wherein the metal comprising the strip and spacing supports is columbium.

* * * * *